(12) United States Patent
Tsuji et al.

(10) Patent No.: US 12,339,367 B2
(45) Date of Patent: Jun. 24, 2025

(54) DETECTION DEVICE, DETERMINATION METHOD, AND NON-TRANSITORY COMPUTER-READABLE MEDIUM

(71) Applicant: NEC Corporation, Tokyo (JP)

(72) Inventors: Akira Tsuji, Tokyo (JP); Yoshimasa Ono, Tokyo (JP); Junichi Abe, Tokyo (JP); Jiro Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 287 days.

(21) Appl. No.: 17/912,945

(22) PCT Filed: Mar. 31, 2020

(86) PCT No.: PCT/JP2020/014844
§ 371 (c)(1),
(2) Date: Sep. 20, 2022

(87) PCT Pub. No.: WO2021/199291
PCT Pub. Date: Oct. 7, 2021

(65) Prior Publication Data
US 2023/0375709 A1    Nov. 23, 2023

(51) Int. Cl.
*G06F 11/30* (2006.01)
*G01S 7/48* (2006.01)
*G01S 17/89* (2020.01)

(52) U.S. Cl.
CPC ............ *G01S 17/89* (2013.01); *G01S 7/4808* (2013.01)

(58) Field of Classification Search
CPC ...................................................... G01S 17/89
See application file for complete search history.

(56) References Cited

U.S. PATENT DOCUMENTS

| 2018/0046195 A1 | 2/2018 | Nakamura et al. |
| 2018/0063488 A1 | 3/2018 | Sekine et al. |
| 2018/0068200 A1* | 3/2018 | Nonaka ................ G06V 10/457 |
| 2019/0266741 A1* | 8/2019 | Uehara .................... G06T 7/13 |

FOREIGN PATENT DOCUMENTS

| CN | 106127771 A | 11/2016 |
| CN | 110380683 A | 10/2019 |
| CN | 110390683 A * | 10/2019 |

(Continued)

OTHER PUBLICATIONS

International Search Report for PCT Application No. PCT/JP2020/014844, mailed on Jul. 7, 2020.

(Continued)

*Primary Examiner* — Phuong Huynh

(57) ABSTRACT

A detection device (10) according to the present disclosure includes an acquisition unit (11) that acquires point cloud data indicating a distance from a measurement device to an object and luminance information obtained from reflected light of a beam emitted when the point cloud data is measured, an edge detection unit (12) that performs edge detection based on the luminance information, and a crack determination unit (13) that determines whether an area indicates a crack by using a shape of the area in which, of a plurality of points indicated by the point cloud data, points having luminance within a predetermined range of difference from luminance of a point detected as an edge are distributed.

12 Claims, 11 Drawing Sheets

(56) References Cited

FOREIGN PATENT DOCUMENTS

| | | | |
|---|---|---|---|
| EP | 3273266 | A1 | 1/2018 |
| JP | 2016-217940 | A | 12/2016 |
| JP | 2017-053819 | A | 3/2017 |
| JP | 2018-025919 | A | 2/2018 |
| JP | 2018-031664 | A | 3/2018 |
| JP | 2018-036226 | A | 3/2018 |
| JP | 2019066265 | A * | 4/2019 |

OTHER PUBLICATIONS

JP Office Action for JP Application No. 2022-513001, mailed on May 16, 2023 with English Translation.

* cited by examiner

DETECTION DEVICE, DETERMINATION METHOD, AND NON-TRANSITORY COMPUTER-READABLE MEDIUM

This application is a National Stage Entry of PCT/JP2020/014844 filed on Mar. 31, 2020, the contents of all of which are incorporated herein by reference, in their entirety.

TECHNICAL FIELD

This disclosure relates to a detection device, a determination method, and a program.

BACKGROUND ART

Techniques for detecting cracks in concrete by performing image processing on images captured by a camera have been studied. For example, Patent Literature 1 discloses a configuration of a surface defect evaluation device that calculates feature values of defects from image data and identifies a set of areas of the feature values of the defects on the image data. The defects on the image data correspond to cracks in concrete.

CITATION LIST

Patent Literature

Patent Literature 1: Japanese Unexamined Patent Application Publication No. 2016-217940

SUMMARY OF INVENTION

Technical Problem

The quality of images captured by a camera is affected by the brightness of the environment surrounding the camera. Therefore, when the surface defect evaluation device disclosed in Patent Literature 1 is used, it is necessary to keep the brightness at a certain level during image capturing to acquire image data of images for effective image processing. However, railroad tunnels, tunnels on roads, and the like, are often not equipped with sufficient brightness lighting over the entire area of the tunnel. Therefore, in order to inspect concrete in tunnels, it is necessary to use large-scale lighting equipment.

A purpose of the present disclosure is to provide a detection device, a determination method, and a program that are capable of detecting a crack even when brightness is not sufficient to acquire image data of an image for effective image processing.

Solution to Problem

A detection device according to a first aspect includes an acquisition unit that acquires point cloud data indicating a distance from a measurement device to an object and luminance information obtained from reflected light of a beam emitted when the point cloud data is measured, an edge detection unit that performs edge detection based on the luminance information, and a crack determination unit that determines whether an area indicates a crack by using a shape of the area in which, of a plurality of points indicated by the point cloud data, points having luminance within a predetermined range of difference from luminance of a point detected as an edge are distributed.

A determination method according to a second aspect includes acquiring point cloud data indicating a distance from a measurement device to an object and luminance information obtained from reflected light of a beam emitted when the point cloud data is measured, performing edge detection based on the luminance information, and determining whether an area indicates a crack by using a shape of the area in which, of a plurality of points indicated by the point cloud data, points having luminance within a predetermined range of difference from luminance of a point detected as an edge are distributed.

A program according to a third aspect causes a computer to execute acquiring point cloud data indicating a distance from a measurement device to an object and luminance information obtained from reflected light of a beam emitted when the point cloud data is measured, performing edge detection based on the luminance information, and determining whether an area indicates a crack by using a shape of the area in which, of a plurality of points indicated by the point cloud data, points having luminance within a predetermined range of difference from luminance of a point detected as an edge are distributed.

Advantageous Effects of Invention

With the present disclosure, it is possible to provide a detection device, a determination method, and a program that are capable of detecting a crack even when brightness is not sufficient to acquire image data of an image for effective image processing.

EXAMPLE EMBODIMENT

First Example Embodiment

Figure 1:
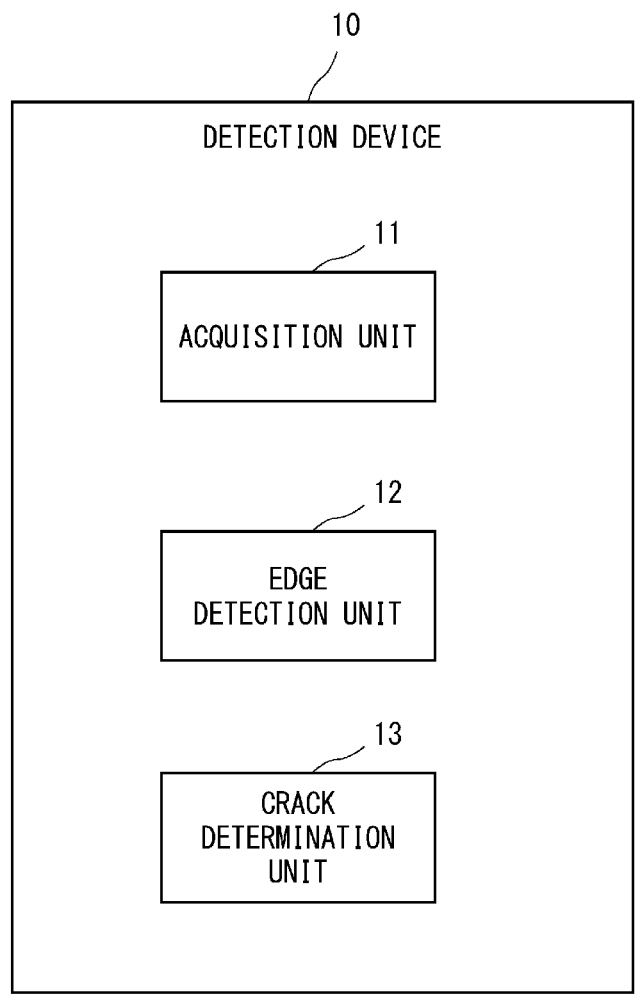
FIG. 1 is a configuration diagram of a detection device according to a first example embodiment.

Hereinafter, example embodiments of the present disclosure are described with reference to the drawings. A configuration example of a detection device according to a first example embodiment is described with reference to FIG. 1. The detection device 10 may be a computer device operated by a processor executing a program stored in a memory. The detection device 10 may be, for example, a server device. The processes to be executed in the detection device 10 may be distributed to and performed on a plurality of computer devices.

The detection device 10 includes an acquisition unit 11, an edge detection unit 12, and a crack determination unit 13. The acquisition unit 11, the edge detection unit 12, and the crack determination unit 13 may be software or modules to be processed by a processor executing a program stored in a memory. Alternatively, the acquisition unit 11, the edge detection unit 12, and the crack determination unit 13 may be hardware, such as circuits or chips.

The acquisition unit 11 acquires point cloud data indicating the distance from a measurement device to an object and luminance information obtained from the reflected light of a beam emitted when the point cloud data is measured. The measurement device is a device that measures point cloud data indicating the distance to an object. The measurement device may be, for example, a three-dimensional (3D) sensor. The 3D sensor may specifically be a 3D-LiDAR device. The 3D-LiDAR device measures the distance to an object by using, for example, the Time of Flight (ToF) technique to identify the shape of the object. The 3D-LiDAR device may be referred to as a laser scanner. The object is an object that may be cracked and is, for example, a wall of a tunnel or a building.

In a case where the detection device 10 includes a measurement device, the acquisition unit 11 may be the measurement device. That is, the acquisition unit 11 operating as the measurement device directly acquires point cloud data and luminance information as measurement results. The case where the detection device 10 includes a measurement device includes a case where the detection device 10 and the measurement device integrally operate. Alternatively, the acquisition unit 11 may be connected to a measurement device via a network. In this case, the acquisition unit 11 may receive point cloud data and luminance information transmitted from the measurement device via the network. The acquisition unit 11 may acquire the point cloud data and the luminance information measured by the measurement device via a portable recording medium or the like.

The edge detection unit 12 performs edge detection based on the luminance information. For example, the edge detection unit 12 detects, for each point contained in the point cloud data, a point with the difference from the luminance of an adjacent point exceeding a prescribed threshold as an edge. Specifically, the edge detection unit 12 may detect, as an edge, a point having luminance that is lower than the luminance of an adjacent point by a prescribed threshold or more. In addition, the edge detection unit 12 may also detect, as an edge, a point having substantially the same luminance as the point detected as an edge. Substantially the same luminance may be luminance within a predetermined range of difference from the luminance of the point of the edge detected because the difference from the luminance of the adjacent point exceeds the prescribed threshold. The value of the luminance within the predetermined range considered to be substantially the same luminance is set to be sufficiently smaller than the value of the threshold used to detect an edge based on the difference from the luminance of the adjacent point. In other words, the edge detection unit 12 detects, as an edge, a set of points whose luminance lowers by the prescribed threshold or more. The set of points whose luminance lowers by the prescribed threshold or more is a crack candidate.

The crack determination unit 13 determines whether an area detected as the edge indicates a crack by using the shape of the area in which, of a plurality of points indicated by the point cloud data, points having the luminance within the predetermined range of difference from the luminance of the point detected as the edge are distributed. In other words, the crack determination unit 13 uses the shape of the set of points detected as the edge to determine whether the shape indicates a crack. For example, the crack determination unit 13 may define criteria for at least one of the length and width of the edge considered to be a crack and determine that the set of points is a crack when the set of points detected as the edge satisfies the prescribed criteria or that the set of points is not a crack when the set of points does not satisfy the prescribed criteria. The prescribed criteria may be, for example, that the length of the edge is greater than or equal to a predetermined value, that the width of the edge is less than or equal to a predetermined width, or the like.

Alternatively, the crack determination unit 13 may determine whether the shape of the set of points detected as the edge indicates a crack by using a learning model learned the shapes of cracks in advance by machine learning or the like.

As described above, the detection device 10 detects an area that is a crack candidate by using luminance information associated with point cloud data. The luminance information is information obtained from reflected light when a beam is emitted to an object. Therefore, the measurement device does not need to maintain the brightness of the surrounding environment above a certain level in order to obtain the luminance information. As a result, the detection device 10 does not require the use of large-scale lighting equipment, even when inspecting concrete or other objects in locations not equipped with sufficient brightness lighting, such as in tunnels.

Second Example Embodiment

Next, an analysis process for a set of points detected as an edge to be performed by an edge detection unit 12 is described with reference to FIG. 2. The edge detection unit 12 detects, of a plurality of points contained in point cloud data, points to be an edge based on luminance information. In addition, the edge detection unit 12 also detects, as an edge, points having the luminance of the points detected as the edge and luminance within a predetermined range.

Figure 2:
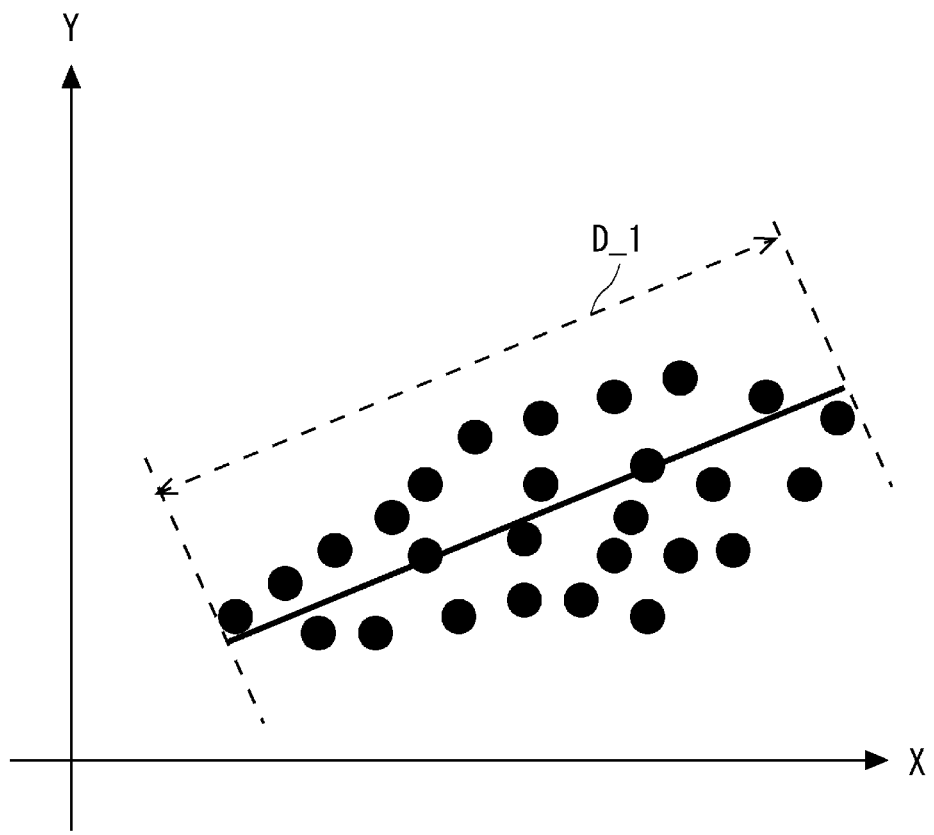
FIG. 2 is a diagram for explaining an analysis process for a set of points according to a second example embodiment.

FIG. 2 shows the distribution of the points detected as the edge by the edge detection unit 12 in an X-Y plane. Each point is 3D data and has a value indicating its position on an X-axis, a Y-axis, and a Z-axis. The X-axis, the Y-axis, and the Z-axis may be, for example, coordinate axes defined by a 3D-LiDAR device. Each of the points shown in FIG. 2 has luminance equivalent to the luminance of the other points. The luminance of a point indicates the luminance of the reflected light of a beam when the beam is reflected at that point.

FIG. 2 shows the distribution of the points detected as the edge in the X-Y plane for ease of understanding, but the actual points detected as the edge are also distributed in the Z axis direction perpendicular to the X-Y plane.

The edge detection unit 12 performs a principle component analysis (PCA) on the distribution of the points detected as the edge as shown in FIG. 2. The principle component analysis is mainly performed to identify the variance of points. Variance may be paraphrased as dispersion.

Specifically, the principle component analysis is performed to calculate the magnitude or length of variance in the direction of the maximum variance of the points as shown in FIG. 2. The solid line shown in the distribution of the points in FIG. 2 indicates the magnitude or length of the variance of the points. The magnitude or length of the variance may be paraphrased as the eigenvalue. In FIG. 2, D_1 indicates the length of the variance in the direction of the maximum variance of the points in the distribution of the points detected as the edge. Here, D_1 is defined as a first principle component. For example, the edge detection unit 12 may calculate D_1 to be the first principle component by calculating the center of gravity in the distribution of the points detected as the edge and calculating the direction of the maximum variance from the center of gravity.

Figure 3:
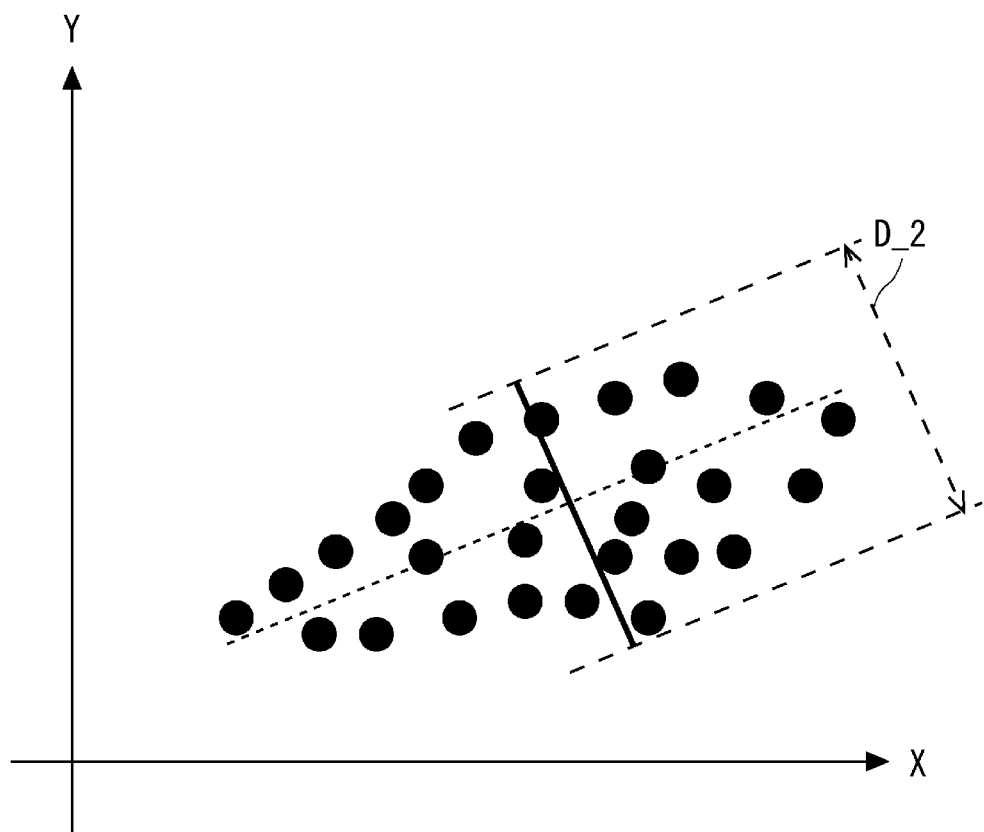
FIG. 3 is a diagram for explaining the analysis process for a set of points according to the second example embodiment.

Next, in the direction orthogonal to the first principle component, the length of the variance in the direction of the maximum variance of the points is calculated. The solid line shown in the distribution of the points in FIG. 3 indicates the magnitude or length of the variance of the points. In FIG. 3, D_2 indicates the length of the variance in the direction of the maximum variance of the points in the direction orthogonal to D_1. Here, D_2 is defined as a second principle component. Next, in the direction orthogonal to the first and second principle components, the length of the variance in the direction of the maximum variance of the points is calculated. Although not shown in FIG. 2, D_3 is the length of the variance in the direction of the maximum variance of the points in the Z-axis direction perpendicular to the X-Y plane in FIG. 2. Here, D_3 is defined as third principle component.

By performing the principle component analysis on the distribution of the point cloud data, which is 3-dimensional data, the first principle component to third principle component can be obtained.

The crack determination unit 13 determines whether the shape indicated by the set of points detected as the edge corresponds to a crack by using the first principle component to third principle component calculated by the edge detection unit 12. In the set of points indicating a crack, the first principle component is assumed to be the direction in which the crack runs, and the second or third principle component is assumed to be the width direction of the crack. The direction in which the crack runs may be paraphrased as the direction in which the crack spreads, the direction in which the crazing of the crack runs, the direction in which the crazing of the crack spreads, or the like. For the shape of a crack, since the length in the direction in which the crack runs is longest, the first principle component is the direction in which the crack runs. One of the second principle component and the third principle component is the width direction of the crack, and the other is the depth direction of the crack.

The crack determination unit 13 may define, for example, the second principle component as the width direction of the crack and the third principle component as the depth direction of the crack. Alternatively, the crack determination unit 13 may define which of the second principle component and the third principle component corresponds to the width direction of the crack by using a learning model machine-learned the shapes of cracks.

Here, the depth direction of the crack is a main component including a measurement error of the 3D-LiDAR device that is the measurement device. The measurement error is an error that occurs when the distance from the measurement device to an object is measured. The crack determination unit 13 may decide which of the second principle component and the third principle component corresponds to the width direction of the crack based on the measurement error data or catalog values specified in the 3D-LiDAR device. For example, the crack determination unit 13 may decide that the principle component whose length of the variance is within the prescribed measurement error data specified in the 3D-LiDAR device is the depth direction of the crack and that the principle component whose length of the variance exceeds the measurement error data is the width direction of the crack.

The crack determination unit 13 may determine whether the set of points detected as the edge indicates a crack based on, for example, the length of the principle component corresponding to the width direction of the crack. For example, suppose that the crack determination unit 13 decides that the second principle component corresponds to the width direction of the crack. In this case, the crack determination unit 13 may determine whether the distribution of the points detected as the edge indicates a crack according to whether the length of the second principle component exceeds a prescribed length threshold. For example, if the length of the second principle component exceeds the prescribed length threshold, the crack determination unit 13 may determine that the set of points detected as the edge is not a crack. On the other hand, if the length of the second principle component does not exceed the prescribed length threshold, the crack determination unit 13 may determine that the set of points detected as the edge is a crack. The length threshold to be compared with the length of the second principle component may be, for example, a value entered by an administrator of the detection device 10 or the like, or a value calculated using a learning model machine-learned the shapes of cracks.

Next, a procedure of a crack determination process of the detection device 10 according to the second example embodiment is described with reference to FIG. 4. First, an acquisition unit 11 acquires point cloud data and luminance information associated with each point in the point cloud data (S11). The luminance information associated with each point is the luminance information about reflected light reflected at that point.

Then, the edge detection unit 12 performs edge detection using the luminance information (S12). The edge detection unit 12 detects, as an edge, a point with the difference from the luminance of an adjacent point exceeding a prescribed threshold.

Then, the edge detection unit 12 extracts points having luminance equivalent to the luminance of the point detected as the edge (S13). In other words, the edge detection unit 12 extracts a plurality of points having luminance whose difference from the luminance of the point detected as the edge is within a prescribed range. The plurality of points extracted by the edge detection unit 12 is distributed in a three-dimensional space.

Then, the edge detection unit 12 performs a principle component analysis on the distribution of the extracted points (S14). By performing the principle component analysis, the edge detection unit 12 calculates a first principle component to a third principle component that indicate the variance or dispersion of the distribution of the points detected as the edge.

Then, the crack determination unit 13 determines whether a set of points detected as the edge is a crack by using a result of the principle component analysis (S15).

Figure 4:
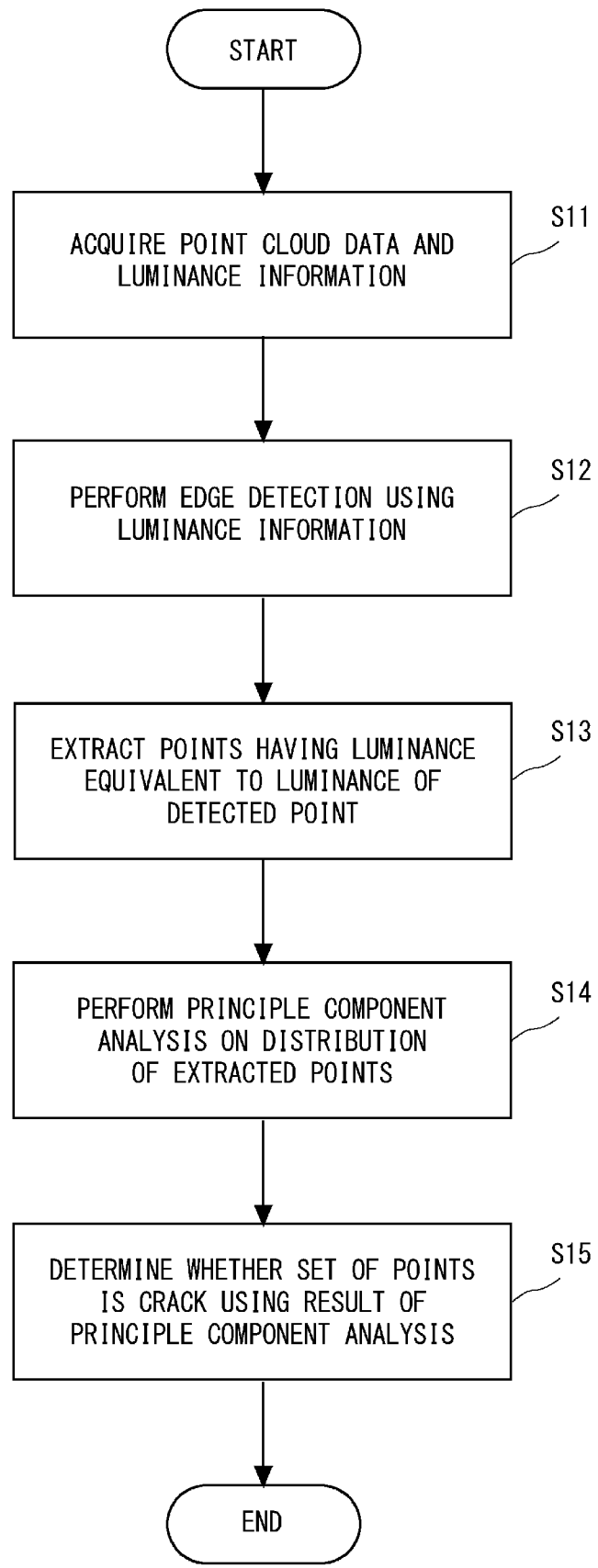
FIG. 4 is a flowchart showing a procedure of a crack determination process of a detection device according to the second example embodiment.
Figure 5:
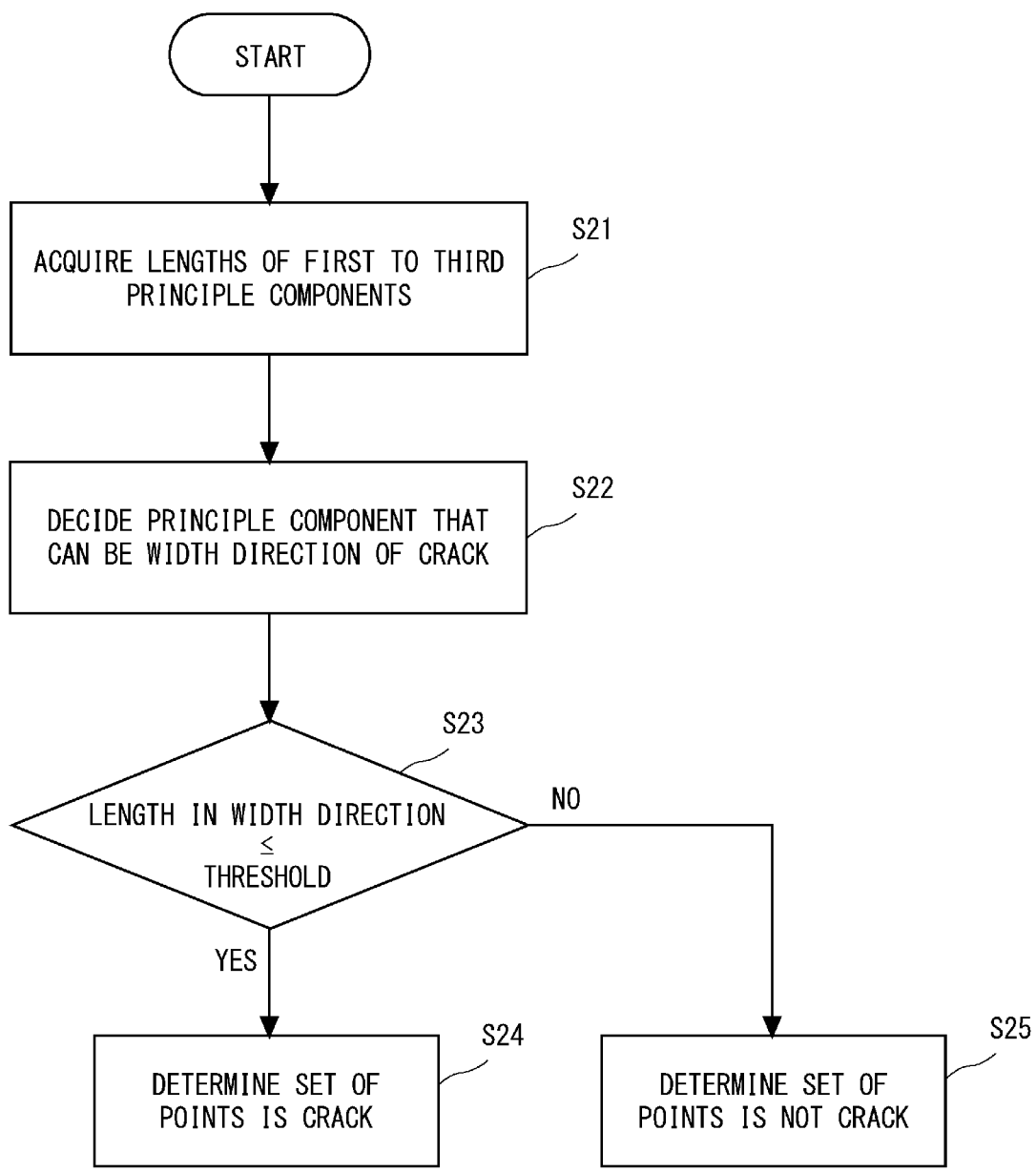
FIG. 5 is a flowchart showing a procedure of a crack determination process of the detection device according to the second example embodiment.

Here, the detailed procedure of the crack determination process in step S15 in FIG. 4 is described with reference to FIG. 5.

In the crack determination process, the crack determination unit 13 first acquires the lengths of the first principle component to third principle component in the distribution of the points detected as the edge from the edge detection unit 12 (S21). The lengths of the first principle component to the third principle component indicate the lengths of the variance. The length of the first principle component is longest and the length of the third principle component is shortest.

Then, the crack determination unit 13 decides the principle component that can be the width direction of the crack among the first principle component to the third principle component (S22). For example, the crack determination unit 13 may decide, among the first principle component to the third principle component, the second principle component having the second longest length to be the principle component in the width direction of the crack. Alternatively, the crack determination unit 13 may decide which of the second principle component and the third principle component corresponds to the width direction of the crack by using a learning model machine-learned the shapes of cracks. Alternatively, the crack determination unit 13 may determine which of the second principle component and the third principle component corresponds to the width direction of the crack based on the measurement error data or catalog values specified in the 3D-LiDAR device.

Next, the crack determination unit 13 determines whether the length of the principle component corresponding to the width direction of the crack is less than or equal to a prescribed length threshold (S23). When determining that the length of the principle component corresponding to the width direction of the crack is less than or equal to the prescribed length threshold, the crack determination unit 13 determines that the set of points detected as the edge is a crack (S24). When determining that the length of the principle component corresponding to the width direction of the crack is not less than or equal to the prescribed length threshold, the crack determination unit 13 determines that the set of points detected as the edge is not a crack (S25).

As explained above, in the second example embodiment, the detection device 10 performs edge detection to identify a shape or area to be a crack candidate. In addition, the detection device 10 performs a principle component analysis on the points forming the shape to be the crack candidate or on the points contained in the area to be the crack candidate. The detection device 10 determines whether the shape or area to be the crack candidate is a crack based on the lengths of the first principle component to the third principle component obtained as the result of the principle component analysis. In this manner, the detection device 10 can extract the shape or area to be a crack candidate by using luminance information even when sufficient brightness cannot be ensured for a camera or the like to capture images. In addition, the detection device 10 can determine whether the crack candidate is a crack by performing the principle component analysis on the points constituting the shape to be the crack candidate or the points contained in the area to be the crack candidate and using the analysis result. As a result, the detection device 10 can identify the location of a crack even in locations where sufficient brightness cannot be ensured.

Third Example Embodiment

Figure 6:
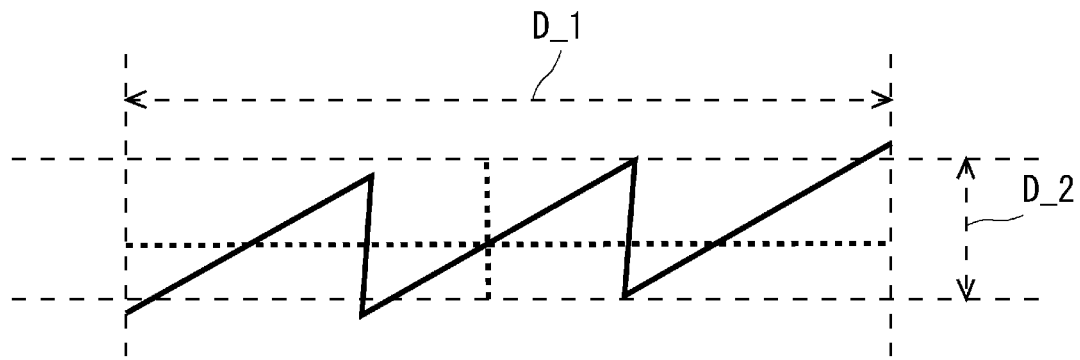
FIG. 6 is a diagram showing a shape of a crack according to a third example embodiment.

Next, an overview of a crack determination process according to a third example embodiment is described. For example, a crack can have not only a straight line shape but also a zigzag shape, as shown in FIG. 6. The solid line in FIG. 6 is a set of points detected as an edge and indicates the shape of a crack. The long dotted line of the thick dotted lines in FIG. 6 is a first principle component having a length $D\_1$. The short dotted line of the thick dotted lines in FIG. 6 is a second principle component having a length $D\_2$. Although not shown in FIG. 6 for ease of explanation, the vertical principle component in FIG. 6 is a third principle component.

In a crack having a zigzag shape, $D\_2$ can be the second principle component as shown in FIG. 6. In this case, the length of the second principle component is longer than that when a crack is a straight line shape. As a result, when a crack determination unit 13 determines whether the length of the second principle component exceeds a prescribed length threshold similarly to the second example embodiment, the length of the second principle component exceeds the threshold, and the crack determination unit 13 determines that the set of points are not a crack although the set of points is actually a crack.

Figure 7:
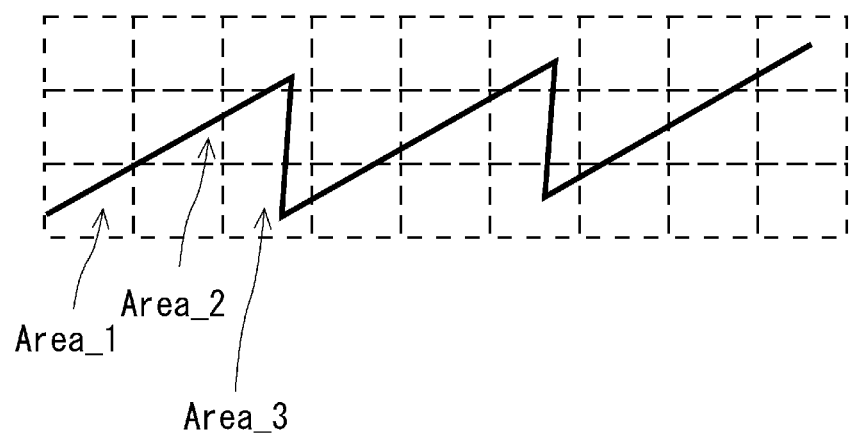
FIG. 7 is a diagram showing the division of a space according to the third example embodiment.

Therefore, in the third example embodiment, when a zigzag shape indicates a set of points detected as an edge as shown in FIG. 7, an edge detection unit 12 divides a space where the points detected as the edge exist into a plurality of spaces. In addition, the edge detection unit 12 performs a principle component analysis on the set of points contained in each divided space. Each space surrounded by dotted lines in FIG. 7 shows one of the divided spaces.

For example, the crack determination unit 13 may determine, of the first principle component to the third principle component calculated for each space, whether the length of the second principle component is less than a prescribed length threshold and determine whether the set of points in each space is a crack.

For example, when the set of points has a shape close to a straight line as in an Area_1 and an Area_2 in FIG. 7, the crack determination unit 13 determines that the set of points is a crack based on the length of the second principle component in many cases. On the other hand, when the set of points has a zigzag shape as in an Area_3, the crack determination unit 13 can determine that the set of points is not a crack because the length of the second principle component is long. Therefore, the crack determination unit 13 may use the results of the principle component analysis on the set of points to determine whether the entire set of points is a crack based on the number of spaces determined to be a crack among the plurality of spaces that has been subjected to the crack determination. For example, the crack determination unit 13 may determine that the entire set of points is a crack when the number of spaces determined to be a crack is greater than the number of spaces determined not to be a crack. Alternatively, the crack determination unit 13 may determine that the entire set of points is a crack when the number of spaces determined to be a crack exceeds a prescribed threshold.

As the number of divisions of the space where the points detected as the edge exist increases, the accuracy of the crack determination process of the crack determination unit 13 is improved.

As described above, the crack determination unit 13 according to the third example embodiment divides a space containing a set of points detected as an edge and performs a principle component analysis on the set of points in the divided spaces. The crack determination unit 13 performs the principle component analysis for each divided space and determines whether the set of points in each divided space is a crack. In addition, the crack determination unit 13 determines whether the entire set of points detected as the edge is a crack by using the result of the determination for each divided space. In this manner, by using the result of the determination for each divided space, the crack determination unit 13 can determine whether the entire set of points is a crack even when the set of points has a zigzag shape in which the length of the second principle component is long, as shown in FIGS. 6 and 7.

Fourth Example Embodiment

Figure 8:
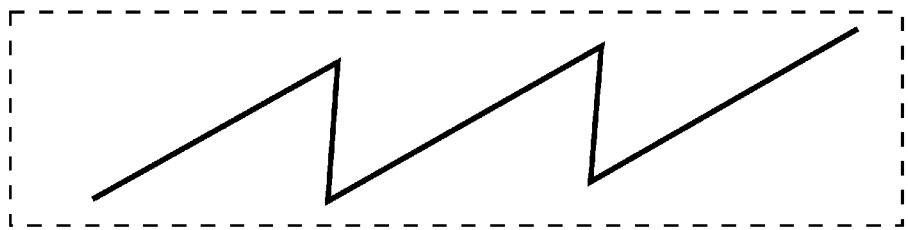
FIG. 8 is a diagram for explaining a point density according to a fourth example embodiment.

Next, a crack determination process according to a fourth example embodiment is described. In the fourth example embodiment, a crack determination process using point density is performed. The point density is defined based on the number of points detected as an edge in a certain area. The details of the point density are described with reference to FIG. 8. The solid line in FIG. 8 indicates a set of points detected as an edge. The area surrounded by the dotted line is an area containing the set of points detected as the edge. In FIG. 8, the area containing the set of points detected as the edge is shown as a rectangle, but the area can be a circle or any other shape.

The point density is the number of points per unit area and indicates, for example, the degree of density of the points in the area surrounded by the dotted line in FIG. 8.

When the set of points detected as the edge indicates a crack, the points are assumed to exist in an area along the crack. On the other hand, when the set of points detected as the edge does not indicate a crack, the points are assumed to be uniformly distributed within a certain area. Therefore, the crack determination process according to the fourth example embodiment presupposes that the point density when the set of points detected as the edge indicates a crack is sufficiently smaller than the point density when the set of points does not indicate a crack.

The area containing the set of points detected as the edge indicated by the dotted line in FIG. 8 may be defined by, for example, executing an object recognition process to be performed when an image indicating the set of points is analyzed. The object recognition processing is a process that identifies an object contained in an image, surrounds the object with a rectangle or other shape, and highlights the identified object. Object recognition may be paraphrased as body recognition, image recognition, or the like Alternatively, the area containing the set of points detected as the edge indicated by the dotted line in FIG. 8 may be input by a user who visually recognizes the set of points detected as the edge in the image. The area containing the set of points detected as the edge may be an area specified by the user.

Figure 9:
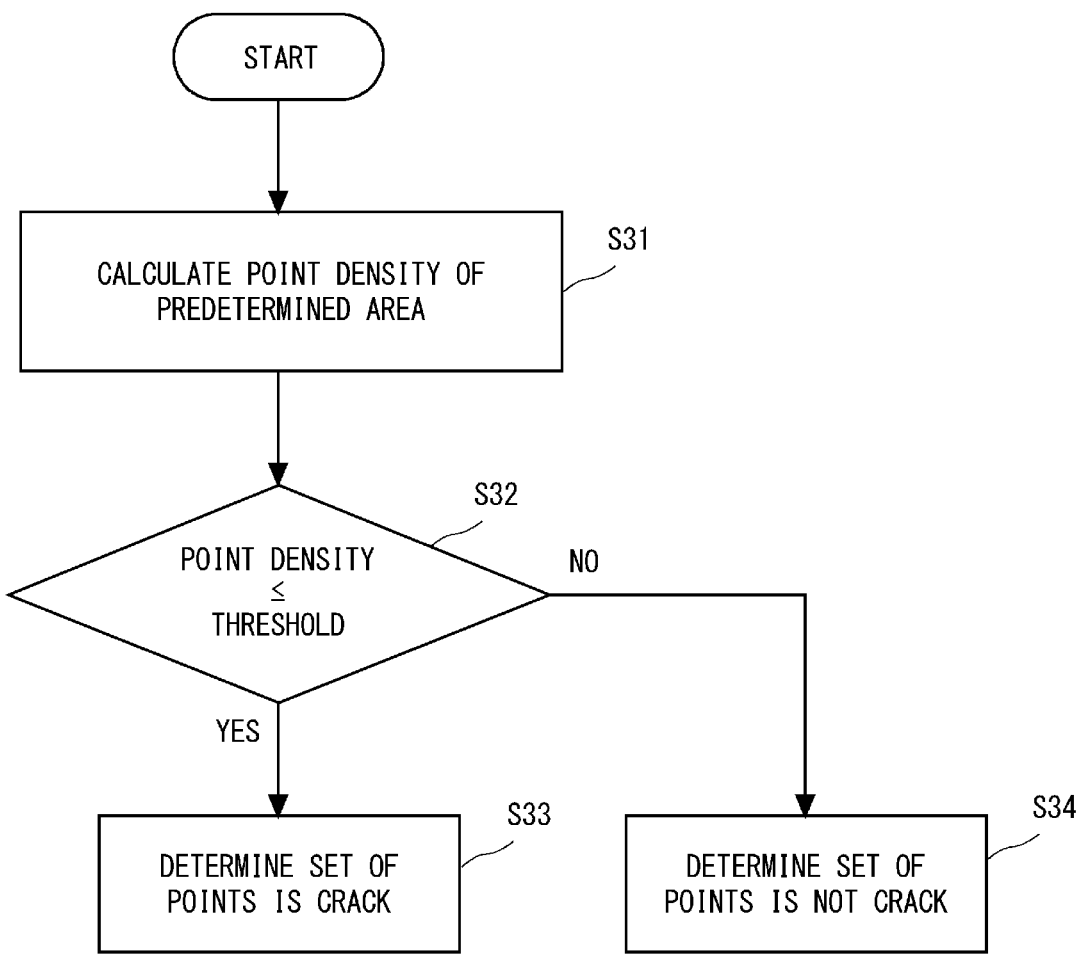
FIG. 9 is a flowchart showing a procedure of a crack determination process of a detection device according to the fourth example embodiment.

Next, a procedure of the crack determination process according to the fourth example embodiment is described with reference to FIG. 9. First, a crack determination unit 13 calculates a point density of points detected as an edge in a predetermined area (S31). Then, the crack determination unit 13 determines whether the point density is less than or equal to a prescribed threshold (S32). When the point density is less than or equal to the prescribed threshold, the crack determination unit 13 determines that the set of points detected as the edge in the predetermined area is a crack (S33). When the point density is not less than or equal to the prescribed threshold, the crack determination unit 13 determines that the set of points detected as the edge in the predetermined area is not a crack (S34).

As described above, in the crack determination process according to the fourth example embodiment, the crack determination process using the point density is performed. Accordingly, it is possible to determine whether the set of points extracted based on luminance is a crack.

Fifth Example Embodiment

Figure 10:
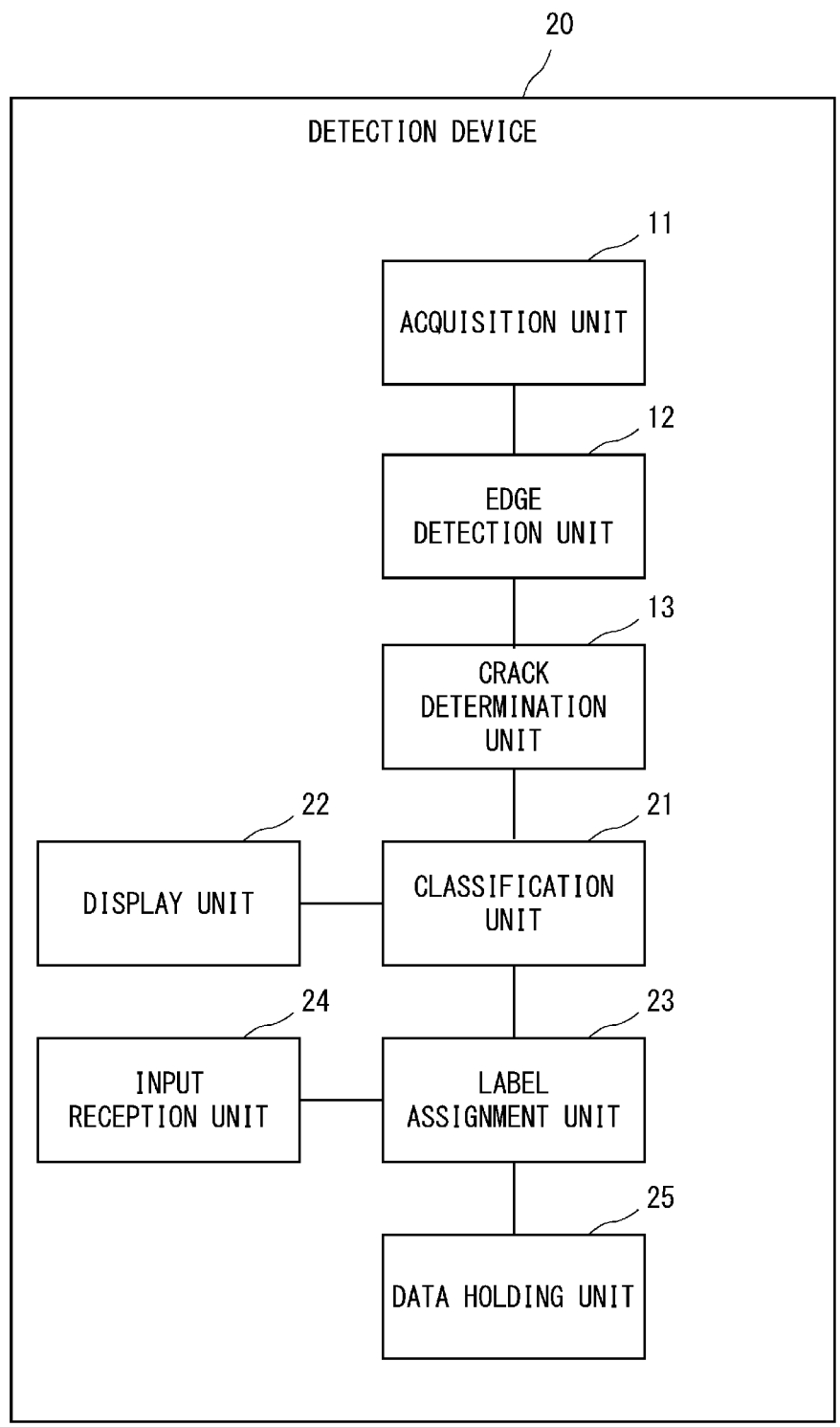
FIG. 10 is a configuration diagram showing a detection device according to a fifth example embodiment.

Next, a configuration example of a detection device 20 according to a fifth example embodiment is described with reference to FIG. 10. The detection device 20 has a configuration in which a classification unit 21, a display unit 22, a label assignment unit 23, an input reception unit 24, and a data holding unit 25 are added to the detection device 10 in FIG. 1. The constituent elements of the detection device 20, such as the classification unit 21 and the like, are software or modules to be processed by a processor executing a program stored in a memory. Alternatively, the constituent elements constituting the detection device 20 may be hardware, such as circuits or chips.

The classification unit 21 classifies a set of points determined to be a crack by a crack determination unit 13 into one of a plurality of groups in accordance with predetermined criteria. Alternatively, the classification unit 21 may classify a set of points whose luminance detected by an edge detection unit 12 lowers by a prescribed threshold or more into one of a plurality of groups in accordance with predetermined criteria. Here, a set of points determined to be a crack by the crack determination unit 13 in the first to fourth example embodiments is treated as a crack candidate in the fifth example embodiment. For example, the classification unit 21 may classify a crack candidate into one of the groups in accordance with the distribution of luminance information associated with each point contained in the crack candidate. For example, the set of points contained in one crack candidate may be expressed as a distribution diagram in a plane with luminance on the horizontal axis and the number of points on the vertical axis, and a plurality of crack candidates having a mean value of luminance within a predetermined range may be classified as the same. The classification unit 21 may define a plurality of groups by defining several ranges, such as classification_1 which is a group of the mean value of luminance ranging from A1 to A2, classification_2 which is a group of the mean value of luminance ranging from A3 to A4, and so on.

Instead of a mean value of luminance, the classification unit 21 may classify a crack candidate into one of the groups based on variance, standard deviation, median, mode, or the like.

Alternatively, the classification unit 21 may classify a crack candidate into one of the groups based on the shape of the crack candidate. For example, the classification unit 21 may classify a crack candidate into one of the groups based on a first principle component to a third principle component obtained from a principle component analysis performed on the distribution of the points contained in the crack candidate. Specifically, the classification unit 21 may classify a plurality of crack candidates whose lengths of the first principle components are within a predetermined range as the same classification. The classification unit 21 may use the second principle component or the third principle component instead of the first principle component.

The classification unit 21 displays at least one of a plurality of crack candidates contained in one group on the display unit 22. The display unit 22 may be, for example, a display. The classification unit 21 may display, on the display unit 22, an arbitrarily selected crack candidate among a plurality of crack candidates contained in one group. Alternatively, the classification unit 21 may display, on the display unit 22, a crack candidate, among a plurality of crack candidates contained in one group, near the boundary of the group. Alternatively, the classification unit 21 may display, on the display unit 22, a crack candidate with high reliability or a crack candidate with low reliability.

Here, the reliability assigned to a crack candidate is described. For example, reliability may be assigned to a crack candidate according to the incident angle of a beam emitted from a 3D-LiDAR device used as a measurement device to an object.

Figure 11:
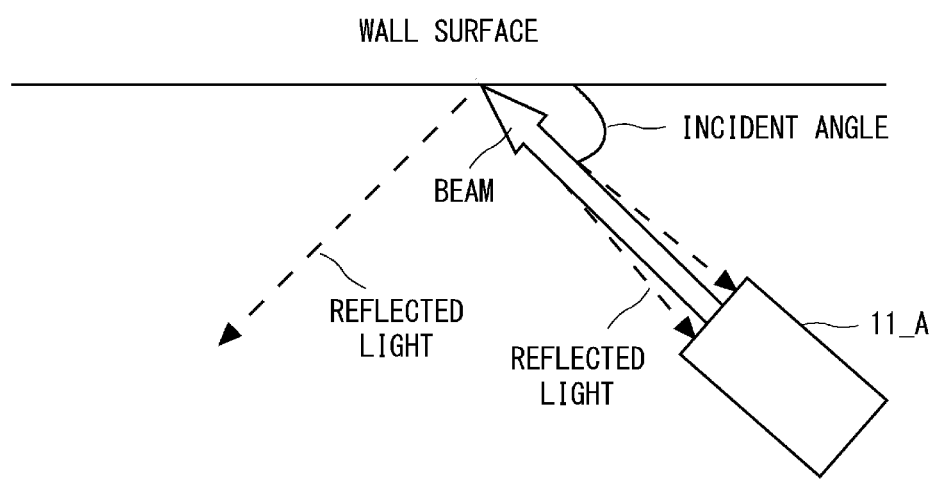
FIG. 11 is a diagram for explaining an incident angle and reflected light of a beam according to the fifth example embodiment.

FIG. 11 shows that a 3D-LiDAR system 11_A emits a beam against a wall. The white arrow in FIG. 11 indicates the beam emitted from the 3D-LiDAR system 11_A. The dotted arrows in FIG. 11 indicate the reflected light when the beam is reflected by the wall surface. The incident angle indicates the incident angle of the beam with respect to the wall surface.

The intensity of the reflected light becomes too strong when the beam emitted from the 3D-LiDAR system 11_A enters an object perpendicularly, and the intensity of the reflected light is not stable when the incident angle is shallow. If the intensity of the reflected light is too strong, unstable, or the like, accurate luminance cannot be obtained. Therefore, by defining a range of incident angles where the intensity of reflected light is too strong and a range of incident angles where the intensity of reflected light is not stable, the reliability of a crack candidate generated based on the luminance information obtained from the reflected light of a beam within the ranges of incident angles may be set low. The reliability of a crack candidate generated based on the luminance information obtained from the reflected light of a beam within a range of incident angles other than the range of incident angles where the intensity of the reflected light is too strong and the range of incident angles where the intensity of the reflected light unstable may be set high.

After visually recognizing the crack candidate displayed on the display unit 22, the user determines whether the crack candidate is a crack. The input reception unit 24 accepts a determination result input from the user. For example, when the user determines that the crack candidate displayed on the display unit 22 is a crack, the user inputs information indicating that the crack candidate is a crack to the input reception unit 24. When the user determines that the crack candidate displayed on the display unit 22 is not a crack, the user inputs information indicating that the crack candidate is not a crack to the input reception unit 24. The information indicating that the crack candidate is a crack and the information indicating that the crack candidate is not a crack may be referred to as, for example, a label. That is, the user inputs a label indicating whether the crack candidate displayed on the display unit 22 is a crack or not.

The label assignment unit 23 associates the group containing the crack candidate displayed on the display unit 22 by the classification unit 21 with the label input to the input reception unit 24 and stores them in the data holding unit 25.

Figure 12:
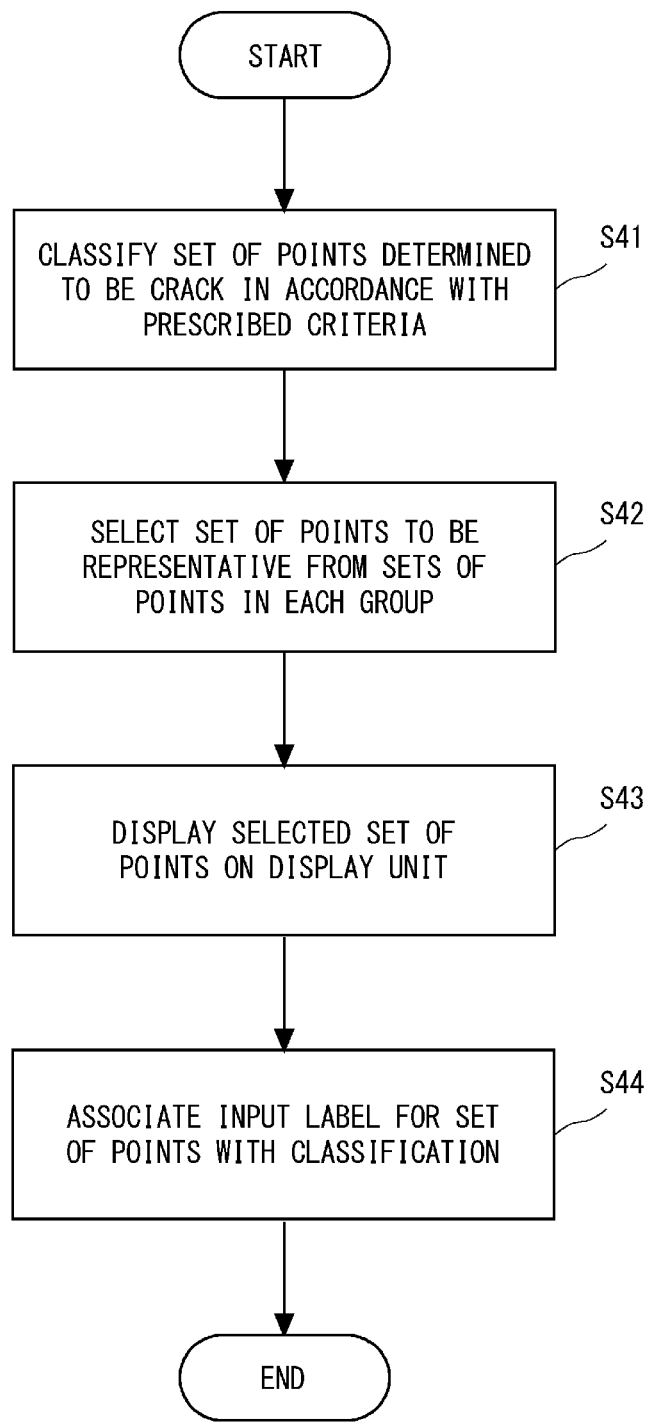
FIG. 12 is a flowchart of a procedure of a process related to assignment of a label according to the fifth example embodiment.

Next, a procedure of a label assignment process according to the fifth example embodiment is described with reference to FIG. 12. The process shown in FIG. 12 presupposes that steps S11 to S15 in FIG. 4 have been performed and that the crack determination unit 13 has completed the crack determination process for a set of points detected as an edge.

First, the classification unit 21 classifies a set of points determined to be a crack into one of a plurality of groups in accordance with prescribed criteria (S41). For example, the classification unit 21 may classify the set of points into one of the plurality of groups according to the mean value or the like of the luminance of each point in the set of points. If there is more than one set of points determined to be a crack, the classification unit 21 classifies each set of points into one of the plurality of groups.

Then, the classification unit 21 selects a set of points to be representative from sets of points in each group (S42). The classification unit 21 may select a set of points to be representative arbitrarily or according to other criteria.

Then, the classification unit 21 displays the selected set of points on the display unit 22 (S43). In other words, the classification unit 21 displays the shape indicated by the selected set of points as a crack candidate on the display unit 22.

Then, the label assignment unit 23 associates a label for the set of points input by the user with the group containing the set of points and stores them in the data holding unit 25 (S44).

As described above, the detection device 20 classifies a plurality of crack candidates determined to be a crack by the crack determination unit 13 into one of groups. In addition, the detection device 20 associates a label input by a user who visually recognizes at least one crack candidate in the group with the group. That is, the user does not need to visually recognize all the crack candidates determined to be a crack by the crack determination unit 13 to assign a label to each crack candidate. The user visually recognizes at least one crack candidate in a group and assign a label to the group containing the crack candidate. That is, the user can collectively assign a label to other crack candidates in the same group that contains the visually recognized crack candidate. As a result, the number of crack candidates that the user has to visually recognize in order to assign a label can be reduced.

By the user visually recognizing a crack candidate extracted by the crack determination unit 13 and assigning a label indicating whether the crack candidate is a crack, it is possible to improve accuracy regarding crack determination.

Figure 13:
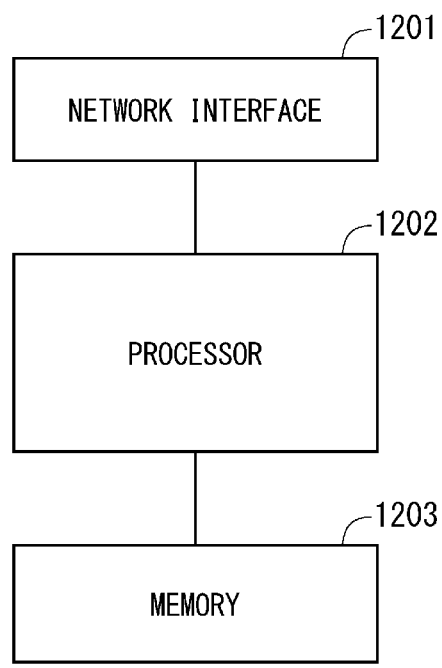
FIG. 13 is a configuration diagram showing a detection device according to each example embodiment.

FIG. 13 is a block diagram showing a configuration example of the detection device 10 and the detection device 20 (hereinafter, referred to as the detection device 10 or the like). Referring to FIG. 13, the detection device 10 or the like includes a network interface 1201, a processor 1202, and a memory 1203. The network interface 1201 is used to communicate with network nodes (e.g., eNBs, MMEs, or P-GWs). The network interface 1201 may include, for example, a network interface card (NIC) in compliance with the IEEE 802.3 series. Here, eNB stands for evolved Node B, MME stands for Mobility Management Entity, and P-GW stands for Packet Data Network Gateway. IEEE stands for Institute of Electrical and Electronics Engineers.

The processor 1202 loads software (a computer program) from the memory 1203 and executes it to perform the processes of the detection device 10 or the like described with reference to the flowcharts in the above example embodiments. The processor 1202 may be, for example, a microprocessor, an MPU, or a CPU. The processor 1202 may include a plurality of processors.

The memory 1203 is configured by a combination of a volatile memory and a nonvolatile memory. The memory 1203 may include a storage located away from the processor 1202. In this case, the processor 1202 may access the memory 1203 via an Input/Output (I/O) interface that is not shown.

In the example in FIG. 13, the memory 1203 is used to store a group of software modules. The processor 1202 loads the group of software modules from the memory 1203 and executes them to perform the processes of the detection device 10 or the like described in the above example embodiments.

As described with reference to FIG. 13, each processor included in the detection device 10 or the like in the above example embodiments executes one or more programs containing a set of instructions for causing a computer to execute the algorithm described with reference to the drawings.

In the above examples, the one or more programs can be stored by various types of non-transitory computer-readable media and provided to a computer. Non-transitory computer-readable media include any type of tangible storage media. Examples of non-transitory computer-readable media include magnetic storage media (such as flexible disks, magnetic tapes, and hard disk drives), optical magnetic storage media (such as magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, and Random Access Memory (RAM)). The one or more programs may be provided to a computer using any type of transitory computer-readable media. Examples of transitory computer-readable media include electric signals, optical signals, and electromagnetic waves. Transitory computer readable media can provide the one or more programs to a computer through a wired communication line (such as electric wires, and optical fibers) or a wireless communication line.

Note that, the present disclosure is not limited to the above example embodiments and can be modified without departing from the gist thereof.

A part or all of the above example embodiments may be described as the following Supplementary notes but are not limited to the following.

(Supplementary Note 1)

A detection device comprising:
an acquisition unit configured to acquire point cloud data indicating a distance from a measurement device to an object and luminance information obtained from reflected light of a beam emitted when the point cloud data is measured;
an edge detection unit configured to perform edge detection based on the luminance information; and
a crack determination unit configured to determine whether an area indicates a crack by using a shape of the area in which, of a plurality of points indicated by the point cloud data, points having luminance within a predetermined range of difference from luminance of a point detected as an edge are distributed.

(Supplementary Note 2)

The detection device according to Supplementary note 1, wherein the crack determination unit is configured to determine whether the area indicates a crack by using variance of the points identified based on the distribution of the points having the luminance within the predetermined range of difference from the luminance of the point detected as the edge.

(Supplementary Note 3)

The detection device according to Supplementary note 2, wherein the crack determination unit is configured to perform a principle component analysis on the distribution of the points having the luminance within the predetermined range of difference from the luminance of the point detected as the edge and to calculate the variance.

(Supplementary Note 4)

The detection device according to Supplementary note 3, wherein the crack determination unit is configured to perform the principle component analysis on the distribution of the points having the luminance within the predetermined range of difference from the luminance of the point detected as the edge and to determine whether the area indicates a crack by using a width of the edge defined according to a value of the variance.

(Supplementary Note 5)

The detection device according to Supplementary note 3 or 4, wherein the crack determination unit is configured to perform the principle component analysis on the distribution of the points having the luminance within the predetermined range of difference from the luminance of the point detected as the edge and to determine whether the area indicates a crack by using, of a plurality of axes defined according to a calculated direction of the distribution of the points and the value of the variance, the width of the edge indicated by one of axes excluding an axis having a largest value of the variance.

(Supplementary Note 6)

The detection device according to Supplementary note 1, wherein the crack determination unit is configured to determine whether the area indicates a crack by using a point density of points contained in the shape of the area in which the points having the luminance within the predetermined range of difference from the luminance of the point detected as the edge are distributed.

(Supplementary Note 7)

The detection device according to Supplementary note 1, wherein
the edge detection unit is configured to generate at least two or more divided areas by dividing the area in which the points having the luminance within the predetermined range of difference from the luminance of the point detected as the edge are distributed, and
the crack determination unit is configured to determine whether an area in which points contained in each divided area are distributed indicates a crack by using a shape of a set of points contained in the divided area.

(Supplementary Note 8)

The detection device according to Supplementary note 7, wherein the crack determination unit is configured to determine whether the area in which the points contained in the divided area are distributed indicates a crack by using variance of the points identified based on the distribution of the points in the divided area.

(Supplementary Note 9)

The detection device according to Supplementary note 8, wherein the crack determination unit is configured to perform a principle component analysis on the distribution of the points in the divided area and to calculate the variance.

(Supplementary Note 10)

The detection device according to Supplementary note 9, wherein the crack determination unit is configured to perform the principle component analysis on the distribution of the points in the divided area and to determine whether the area in which the points contained in the divided area are distributed indicates a crack by using a width of the edge defined according to a value of the variance.

(Supplementary Note 11)

The detection device according to Supplementary note 9 or 10, wherein the crack determination unit is configured to perform the principle component analysis on the distribution of the points in the divided area and to determine whether the area in which the points contained in the divided area are distributed indicates a crack by using, of a plurality of axes defined according to a calculated direction of the distribution of the points and the value of the variance, the width of the edge indicated by one of axes excluding an axis having a largest value of the variance.

(Supplementary Note 12)

A determination method comprising:
acquiring point cloud data indicating a distance from a measurement device to an object and luminance information obtained from reflected light of a beam emitted when the point cloud data is measured;
performing edge detection based on the luminance information; and
determining whether an area indicates a crack by using a shape of the area in which, of a plurality of points indicated by the point cloud data, points having luminance within a predetermined range of difference from luminance of a point detected as an edge are distributed.

(Supplementary Note 13)

A non-transitory computer-readable medium storing a program causing a computer to execute:
acquiring point cloud data indicating a distance from a measurement device to an object and luminance information obtained from reflected light of a beam emitted when the point cloud data is measured;
performing edge detection based on the luminance information; and
determining whether an area indicates a crack by using a shape of the area in which, of a plurality of points indicated by the point cloud data, points having luminance within a predetermined range of difference from luminance of a point detected as an edge are distributed.

REFERENCE SIGNS LIST

10 Detection device
11 Acquisition unit
12 Edge detection unit
13 Crack determination unit
20 Detection device
21 Classification unit
22 Display unit
23 Label assignment unit
24 Input reception unit
25 Data holding unit

What is claimed is:

1. A detection device comprising:
at least one memory storing instructions, and
at least one processor configured to execute the instructions to;
acquire point cloud data indicating a distance from a measurement device to an object and luminance information obtained from reflected light of a beam emitted when the point cloud data is measured;
perform edge detection based on the luminance information; and
determine whether an area indicates a crack by using a shape of the area in which, of a plurality of points indicated by the point cloud data, points having luminance within a predetermined range of difference from luminance of a point detected as an edge are distributed
wherein the at least one processor is further configured to execute the instructions to generate at least two or more divided areas by dividing the area in which the points having the luminance within the predetermined range of difference from the luminance of the point detected as the edge are distributed, and
determine whether an area in which points contained in each divided area are distributed indicates a crack by using a shape of a set of points contained in the divided area.

2. The detection device according to claim 1, wherein the at least one processor is further configured to execute the instructions to determine whether the area indicates a crack by using variance of the points identified based on the distribution of the points having the luminance within the predetermined range of difference from the luminance of the point detected as the edge.

3. The detection device according to claim 2, wherein the at least one processor is further configured to execute the instructions to perform a principal component analysis on the distribution of the points having the luminance within the predetermined range of difference from the luminance of the point detected as the edge and calculate the variance.

4. The detection device according to claim 3, wherein the at least one processor is further configured to execute the instructions to perform the principal component analysis on the distribution of the points having the luminance within the predetermined range of difference from the luminance of the point detected as the edge and determine whether the area indicates a crack by using a width of the edge defined according to a value of the variance.

5. The detection device according to claim 3, wherein the at least one processor is further configured to execute the instructions to perform the principal component analysis on the distribution of the points having the luminance within the predetermined range of difference from the luminance of the point detected as the edge and determine whether the area indicates a crack by using, of a plurality of axes defined according to a calculated direction of the distribution of the points and the value of the variance, the width of the edge indicated by one of axes excluding an axis having a largest value of the variance.

6. The detection device according to claim 1, wherein the at least one processor is further configured to execute the instructions to determine whether the area indicates a crack by using a point density of points contained in the shape of the area in which the points having the luminance within the predetermined range of difference from the luminance of the point detected as the edge are distributed.

7. The detection device according to claim 1, wherein the at least one processor is further configured to execute the instructions to determine whether the area in which the points contained in the divided area are distributed indicates a crack by using variance of the points identified based on the distribution of the points in the divided area.

8. The detection device according to claim 7, wherein the at least one processor is further configured to execute the instructions to perform a principal component analysis on the distribution of the points in the divided area and calculate the variance.

9. The detection device according to claim 8, wherein the at least one processor is further configured to execute the instructions to perform the principal component analysis on the distribution of the points in the divided area and determine whether the area in which the points contained in the divided area are distributed indicates a crack by using a width of the edge defined according to a value of the variance.

10. The detection device according to claim 8, wherein the at least one processor is further configured to execute the instructions to perform the principal component analysis on the distribution of the points in the divided area and determine whether the area in which the points contained in the divided area are distributed indicates a crack by using, of a plurality of axes defined according to a calculated direction of the distribution of the points and the value of the variance, the width of the edge indicated by one of axes excluding an axis having a largest value of the variance.

11. A determination method comprising:
acquiring point cloud data indicating a distance from a measurement device to an object and luminance information obtained from reflected light of a beam emitted when the point cloud data is measured;
performing edge detection based on the luminance information;
generating at least two or more divided areas by dividing the area in which the points having the luminance within a predetermined range of difference from the luminance of the point detected as the edge are distributed; and
determining whether an area in which points contained in each divided area are distributed indicates a crack by using a shape of a set of points contained in the divided area.

12. A non-transitory computer-readable medium storing a program causing a computer to execute:
acquiring point cloud data indicating a distance from a measurement device to an object and luminance information obtained from reflected light of a beam emitted when the point cloud data is measured;
performing edge detection based on the luminance information;
generating at least two or more divided areas by dividing the area in which the points having the luminance within a predetermined range of difference from the luminance of the point detected as the edge are distributed; and
determining whether an area in which points contained in each divided area are distributed indicates a crack by using a shape of a set of points contained in the divided area.

* * * * *